US010364783B2

(12) United States Patent
Hwang

(10) Patent No.: US 10,364,783 B2
(45) Date of Patent: Jul. 30, 2019

(54) PULSATION REDUCER USING DOUBLE-SIDED MULTILAYER WAVEFORM SPRING

(71) Applicant: Hyun Sik Hwang, Seoul (KR)

(72) Inventor: Hyun Sik Hwang, Seoul (KR)

( * ) Notice: Subject to any disclaimer, the term of this patent is extended or adjusted under 35 U.S.C. 154(b) by 39 days.

(21) Appl. No.: 15/747,347

(22) PCT Filed: Aug. 23, 2016

(86) PCT No.: PCT/KR2016/009332
§ 371 (c)(1),
(2) Date: Jan. 24, 2018

(87) PCT Pub. No.: WO2017/047941
PCT Pub. Date: Mar. 23, 2017

(65) Prior Publication Data
US 2018/0216590 A1 Aug. 2, 2018

(30) Foreign Application Priority Data
Sep. 14, 2015 (KR) .................. 10-2015-0129917

(51) Int. Cl.
*F02M 55/04* (2006.01)
*F16F 15/08* (2006.01)
(Continued)

(52) U.S. Cl.
CPC ............ *F02M 55/04* (2013.01); *F02M 55/02* (2013.01); *F16F 1/373* (2013.01); *F16F 3/093* (2013.01);
(Continued)

(58) Field of Classification Search
CPC .. F02M 55/04; F02M 55/02; F02M 2200/315; F16F 1/373; F16F 3/093; F16F 15/046; F16F 15/08; F16F 2230/0005
See application file for complete search history.

(56) References Cited

U.S. PATENT DOCUMENTS 6,401,691 B1 * 6/2002 Kawano ............... F02M 55/025
123/456
2015/0096536 A1 * 4/2015 Hwang .................. F02M 55/02
123/456

FOREIGN PATENT DOCUMENTS

JP H08-261098 A 10/1996
JP 2000-192872 A 7/2000
(Continued)

*Primary Examiner* — Hieu T Vo
(74) *Attorney, Agent, or Firm* — KORUS Patent, LLC; Seong Il Jeong

(57) ABSTRACT

The present invention relates to a pulsation reducer which includes: an entrance-expanded fuel rail (40) configured such that a section-expanded fuel rail entrance (41) expanded to the size of the section of a high-pressure fuel line (31) is foiled thereon; a spring housing (61) configured such that a fuel storage space (611) and a low-pressure movement space (613) and high-pressure movement space (614) connected to the fuel storage space (611) via chimney holes (612a and 612b) are formed therein; connection parts (62a, 62b and 62c) configured to connect the spring housing 61 with the entrance-expanded fuel rail (40); a low-pressure reduction part (631) disposed in the low-pressure movement space (613), and configured to absorb mixed pulse waves in a low-pressure region; and a high-pressure reduction part (64) disposed in the high-pressure movement space (614), and configured to absorb mixed pulse waves in a high-pressure region.

16 Claims, 8 Drawing Sheets

(51) Int. Cl.
*F02M 55/02* (2006.01)
*F16F 3/093* (2006.01)
*F16F 1/373* (2006.01)
*F16F 15/04* (2006.01)

(52) U.S. Cl.
CPC ............ *F16F 15/046* (2013.01); *F16F 15/08* (2013.01); *F02M 2200/315* (2013.01); *F16F 2230/0005* (2013.01)

(56) References Cited

FOREIGN PATENT DOCUMENTS

| | | |
|---|---|---|
| JP | 2006-194233 A | 7/2006 |
| KR | 10-2009-0114686 A | 7/2000 |
| KR | 10-2013-0121280 A | 11/2013 |
| KR | 10-1335871 B1 | 12/2013 |

* cited by examiner

PULSATION REDUCER USING DOUBLE-SIDED MULTILAYER WAVEFORM SPRING

TECHNICAL FIELD

The present invention relates to a pulsation reducer using a double-sided multilayer waveform spring.

BACKGROUND ART

Vehicle gasoline engines are classified into multi-port injection (MPI) engines and gasoline direct injection (GDI) engines according to their fuel injection method.

In a GDI engine, fuel stored in a fuel tank is supplied to the engine by a low-pressure fuel pump. The low-pressure fuel supplied to the engine is compressed into high-pressure fuel by a high-pressure piston fuel pump, and is then supplied to a fuel injector through a high-pressure fuel line and a fuel rail.

The fuel injector of the GDI engine is configured to directly inject the high-pressure fuel, pumped under a high pressure, into a cylinder. The fuel of the GDI engine is converted into high-pressure, fine injected particles engine and directly injected into the cylinder by the fuel injector. The injected fuel is exploded through the ignition of an ignition plug, and thus the fuel is completely combusted. Accordingly, the GDI engine is an engine which is capable of preventing atmospheric and environmental pollution because fuel combustion efficiency is high and completed combusted engine exhaust gas is discharged.

Recently, a high-pressure GDI engine in which fuel pressure is equal to or higher than 350 bars has been developed. The high-pressure GDI engine includes a high-pressure piston fuel pump, i.e., a high-pressure generator, a high-pressure fuel line, a fuel rail, and a fuel injector.

In the high-pressure GDI engine, fuel pressure is about 35 bars during low-speed idle driving, and fuel pressure ranges from 35 to 350 bars during high-speed driving.

Such a high-pressure GDI engine requires a high-pressure piston fuel pump in which the range of fuel pressure variation is 10 or more times. High-pressure fuel is obtained and also a pump pulse wave having a large amplitude is generated by the high-pressure piston fuel pump. Furthermore, when high-pressure fuel injection is performed via the fuel injector, a fuel injection pulse wave is generated inside a fuel rail.

Accordingly, mixed pulse waves in which a pump pulse wave and a fuel injection pulse wave are mixed together and which have a large amplitude are present inside the fuel rail.

When mixed pulse waves having a large amplitude are directly transferred to the fuel injector, the amount of fuel injected varies every moment. Due to variation in the amount of fuel injected, fuel is incompletely combusted, and thus engine combustion efficiency is reduced due to the incomplete combustion. Due to the incomplete combustion of fuel, the discharge of engine exhaust gas to the atmosphere causes atmospheric and environmental pollution, and mixed pulse waves cause the generation of the vibration and noise of an engine.

For the above-described reasons, there is required a wide pressure range pulsation reducer which is capable of reducing mixed pulse waves over a wide pressure range.

Conventionally, an orifice is installed at a fuel rail entrance, and reduces high-pressure pulse waves. The pulsation reducer using an orifice uses a method in which the fuel rail entrance is rapidly reduced to a size which is 1/10 or less times the section of a high-pressure fuel line, and thus the flow rate and pressure resistance of fuel are generated, thereby reducing pulsation waves.

Although the above-described pulsation reducer using an orifice can reduce a pump pulse wave, it cannot reduce a fuel injection pulse wave which is generated inside the fuel rail. Furthermore, the method using an orifice generates high pump loss (the high flow rate and pressure losses of the high-pressure piston fuel pump) because it uses fuel resistance.

Furthermore, Korean Patent No. 10-1168591 discloses a pulsation reducer using a disk spring. The pulsation reducer uses a single disk spring, and has the disadvantage of having insufficient performance in term of a reduction in pulsation over a wide pressure range, unlike a GDI engine.

Furthermore, Korean Patent No. 10-1424994 discloses a pulsation reducer using a composite disk spring. In the pulsation reducer, a piston is connected to a composite spring, and reduces pulsation. The pulsation reducer is a pulsation reducer using an indirect contact method in which pulse waves within fuel are transferred to the composite spring through the piston.

The pulsation reducer is configured such that pulse waves within fuel come into contact with the piston and pulse waves do not come into direct contact with the composite spring. The pulsation reducer has a low reaction speed when reacting to high-frequency pulse waves, and thus has the defect of not reducing high-frequency pulse waves within fuel, unlike a GDI engine.

Furthermore, the pulsation reducer has a disadvantage in that it can reduce only fuel pulse waves of an MPI engine using a single layer double-sided waveform spring over a pressure range of 4.5 bars.

DISCLOSURE

Technical Problem

The present invention provides a pulsation reducer using a double-sided multilayer waveform spring, which is capable of reducing mixed pulse waves which are present in fuel supplied to an entrance-expanded fuel rail and in which a pump pulse wave and a fuel injection pulse wave are mixed together.

The present invention provides a pulsation reducer using a double-sided multilayer waveform spring, which is capable of increasing engine efficiency by eliminating pressure and flow rate losses of a high-pressure piston fuel pump by means of an entrance-expanded fuel rail, thereby improving vehicle fuel efficiency.

The present invention provides a pulsation reducer using a double-sided multilayer waveform spring, which is capable of reducing the vibration and noise of an engine by reducing pulsation present in high-pressure fuel.

The present invention provides a pulsation reducer using a double-sided multilayer waveform spring, which enables a fuel injector to perform multi-port injection, thereby reducing the consumption of engine fuel, improving engine output, and enabling fuel to be completely combusted.

The present invention provides a pulsation reducer using a double-sided multilayer waveform spring, which is capable of reducing harmful materials discharged through exhaust gas, thereby overcoming problems, such as atmospheric and environmental pollution attributable to vehicles, etc.

Technical Solution

According to an embodiment of the present invention, there is provided a pulsation reducer, including: an entrance-expanded fuel rail (40) configured such that a section-expanded fuel rail entrance (41) expanded to the size of the section of a high-pressure fuel line (31) is formed thereon; a spring housing (61) configured such that a fuel storage space (611) and a low-pressure movement space (613) and high-pressure movement space (614) connected to the fuel storage space (611) via chimney holes (612a and 612b) are formed therein; connection parts (62a, 62b and 62c) configured to connect the spring housing (61) with the entrance-expanded fuel rail (40); a low-pressure reduction part (631) disposed in the low-pressure movement space (613), and configured to absorb mixed pulse waves in a low-pressure region; and a high-pressure reduction part (64) disposed in the high-pressure movement space (614), and configured to absorb mixed pulse waves in a high-pressure region; wherein the fuel storage space (611) is connected with the inside of the entrance-expanded fuel rail (40), and the mixed pulse waves reach the low-pressure reduction part (63) and the high-pressure reduction part (64) through the fuel storage space (611) inside the entrance-expanded fuel rail (40), along with fuel, and are reduced.

The low-pressure reduction part (63) may include: a low-pressure multilayer waveform spring (631) configured to attenuate the mixed pulse waves in the low-pressure region, and a low-pressure spring cover (632) configured to fasten the low-pressure multilayer waveform spring (631) within the low-pressure movement space (613); and the center portion of the inside of the low-pressure multilayer waveform spring (631) may be connected with the fuel storage space (611) through a chimney hole (612a), the outer surface of the low-pressure multilayer waveform spring (631) and the center portion of the inside of the low-pressure spring cover (632) may form a curved surface-shaped space, and a low-pressure spring movement space (632a) configured such that the low-pressure multilayer waveform spring (631) vibrates therein may be formed between the outer surface of the low-pressure multilayer waveform spring (631) and the center portion of the inside of the low-pressure spring cover (632).

A curved surface-shaped low-pressure spring cushion pad (632b) may be installed on the inner curved surface of the low-pressure spring cover (632) such that the low-pressure spring cushion pad (632b) buffers and absorbs impact when the low-pressure multilayer waveform spring (631) comes into contact with the low-pressure spring cover (632) due to vibration and expansion.

The low-pressure multilayer waveform spring (631) may include a first low-pressure waveform spring (631a) and a second low-pressure waveform spring (631b), and the first low-pressure waveform spring (631a) and the second low-pressure waveform spring (631b) may be made of different materials and formed to have different thicknesses.

The edge of the low-pressure spring cover (632), the edge of the low-pressure multilayer waveform spring (631), and the inner surface of the spring housing (61) forming the low-pressure movement space (613) may be superimposed on one another, a pressing groove (634b) configured such that an edge of the low-pressure multilayer waveform spring (631) is inserted thereinto may be formed along the inner edge of the low-pressure spring cover (632) in a circumferential direction, a pressing protrusion (634a) configured to press the low-pressure multilayer waveform spring (631) into the pressing groove (634b) may be formed on the inner surface of the spring housing (61), and the outer surface of the low-pressure spring cover (632) may come into contact with the inner surface of the spring housing (61).

The low-pressure reduction part (63) may further include: a low-pressure spring airtight waveform membrane (635) disposed between the inner surface of the spring housing (61) and the low-pressure multilayer waveform spring (631) forming the low-pressure movement space (613), and configured to absorb low-pressure mixed pulse waves within the entrance-extended rail (40) while maintaining primary water-tightness; and a low-pressure spring cover O-ring (636) disposed between the inner surface of the spring housing (61) and the outer surface of the low-pressure spring cover (632).

The high-pressure reduction part (64) may include a high-pressure spring cover (642) configured to fasten the high-pressure multilayer waveform spring (641) and the high-pressure multilayer waveform spring (641), which attenuate the mixed pulse waves in the high-pressure region, within the high-pressure movement space (614); and the center portion of the inside of the high-pressure multilayer waveform spring (641) may be connected to the fuel storage space (611) through a chimney hole (612b), the outer surface of the high-pressure multilayer waveform spring (641) and the center portion of the inside of the high-pressure spring cover (642), which are opposite to each other, may form a curved surface-shaped space, and a high-pressure spring movement space (642a) configured such that the high-pressure multilayer waveform spring (641) vibrates therein may be formed between the outer surface of the high-pressure multilayer waveform spring (641) and the center portion of the inside of the high-pressure spring cover (642).

A curved surface-shaped high-pressure spring cushion pad (642b) may be installed on the inner curved surface of the high-pressure spring cover (642) such that the curved surface-shaped high-pressure spring cushion pad (642b) buffers and absorbs impact when the high-pressure multilayer waveform spring (641) comes into contact with the high-pressure spring cover (642) due to vibration and expansion.

The high-pressure multilayer waveform spring (641) may include a first high-pressure waveform spring (641a), a second high-pressure waveform spring (641b), and a third high-pressure waveform spring (641c), and the first high-pressure waveform spring (641a), the second high-pressure waveform spring (641b), and the third high-pressure waveform spring (641c) may be made of different materials and formed to have different thicknesses.

The edge of the high-pressure spring cover (642), the edge of the high-pressure multilayer waveform spring (641), and the inner surface of the spring housing (61) forming the high-pressure movement space (614) may be superimposed on one another, a pressing groove (644b) configured such that the edge of the high-pressure multilayer waveform spring (641) is inserted thereinto may be formed along the inner edge of the high-pressure spring cover (642) in a circumferential direction, a pressing protrusion (644a) configured to press the high-pressure multilayer waveform spring (641) into the pressing groove (644b) may be formed on the inner surface of the spring housing (61), and the outer surface of the high-pressure spring cover (642) may come into contact with the inner surface of the spring housing (61).

The high-pressure reduction part (64) may further include: a high-pressure spring airtight waveform membrane (645) disposed between the inner surface of the spring housing (61) and the high-pressure multilayer waveform spring (641) forming the high-pressure movement space 614, and configured to absorb high-pressure mixed pulse waves within the entrance-extended rail (40) while maintaining primary water-tightness; and a high-pressure spring cover O-ring (646) disposed between the inner surface of the spring housing (61) and the outer surface of the high-pressure spring cover (642).

The connection part (62a) may include: a connection nipple (621) configured to be coupled with the entrance-expanded fuel rail (40); a connection pipe (622) connected to the spring housing (61), and detachably coupled to the connection nipple (621); a connection nut (624) configured to connect the connection pipe (622) with the connection nipple (621); and a nipple O-ring (625b) disposed in the inner surface of the connection nipple (621) which is opposite to the bottom surface of the connection pipe (622).

The connection part (62a) may further include a location setting depression (623a) and a location setting protrusion (623b) formed in a portion where the connection nipple (621) and the connection pipe (622) come into contact with each other; and, when the location setting protrusion (623b) is inserted into the location setting depression (623a), the direction of the spring housing (61) may be set.

The connection part (62b) may include: a connection socket (626) configured to have a fastening hole (626d) and to be coupled to the entrance-expanded fuel rail (40); a flange bolt (627) formed in the spring housing 61 and tightened into the fastening hole (626d); and a socket O-ring (626c) disposed between the flange bolt (627) and the connection socket (626); and a socket path (626a) and a flange connection path (627a) configured to connect the inside of the entrance-expanded fuel rail (40) with the fuel storage space (611) may be formed inside the connection socket (626) and the flange bolt (627).

The connection part (62c) may include a housing connection pipe (628) configured to protrude from the spring housing (61), and a connection pipe flange (629) connected to the housing connection pipe (628), and configured to come into contact with an outer surface of the entrance-expanded fuel rail (40); a housing connection pipe path (628a) configured to connect the fuel storage space (611) with the entrance-expanded fuel rail (40) may be formed inside the housing connection pipe (628), and the entrance-expanded fuel rail (40) and the spring housing (61) may be bonded to each other on the brazing surface 629a in an integrated manner while maintaining water-tightness therebetween.

The brazing surface (629a) may be expanded by inserting an insertion tube (647) between the housing connection pipe path (628a) of the connection pipe flange (629) and the fuel rail hole (42), thereby improving bonding strength between the connection pipe flange (629) and the entrance-expanded fuel rail (40).

ADVANTAGEOUS EFFECTS

The pulsation reducer according to an embodiment of the present invention is installed in the section-reduced small-sized orifice free entrance-expanded fuel rail after the section of the fuel rail entrance has been made the same as the section of the high-pressure fuel line which is coupled to the entrance-expanded fuel rail. Mixed pulse waves in which a pump pulse wave generated by the high-pressure piston fuel pump of a GDI engine and a fuel injection pulse wave generated by the fuel injector are mixed together are reduced by the low-pressure and high-pressure multilayer waveform springs divided into a low-pressure region and a high-pressure region inside the pulsation reducer. Accordingly, a pulsation reducer without the resistance loss of fuel which is supplied through the driving of a high-pressure piston fuel pump can be obtained.

According to an embodiment of the present invention, the pulsation reducer is installed in the entrance-expanded fuel rail from which an orifice has been removed, and thus effects can be achieved in that mixed pulse waves present within the entrance-expanded fuel rail are reduced and the noise and vibration of an engine are reduced due to the reduction in the mixed pulse waves.

According to an embodiment of the present invention, multi-port injection in which fuel is injected into an engine cylinder two to five times per cycle through the elimination of mixed pulse waves in fuel. Fuel is completely combusted through multiple fuel injection, and thus an effect is achieved in that engine combustion efficiency is improved. Furthermore, carbonized material particulate mass (PM) and carbonized material particulate number (PN) regarding engine exhaust gas regulations can be reduced.

MODE FOR INVENTION

Embodiments of the present invention will be described in detail below such that those having ordinary knowledge in the art to which the present invention pertains can easily practice the present invention. However, the present invention may be implemented in various different forms, and is not limited to the embodiments described herein. Throughout the specification, the same reference symbols will be assigned to similar portions.

Then, a pulsation reducer according to an embodiment of the present invention will be described with reference to FIGS. 1 to 6.

Figure 1:
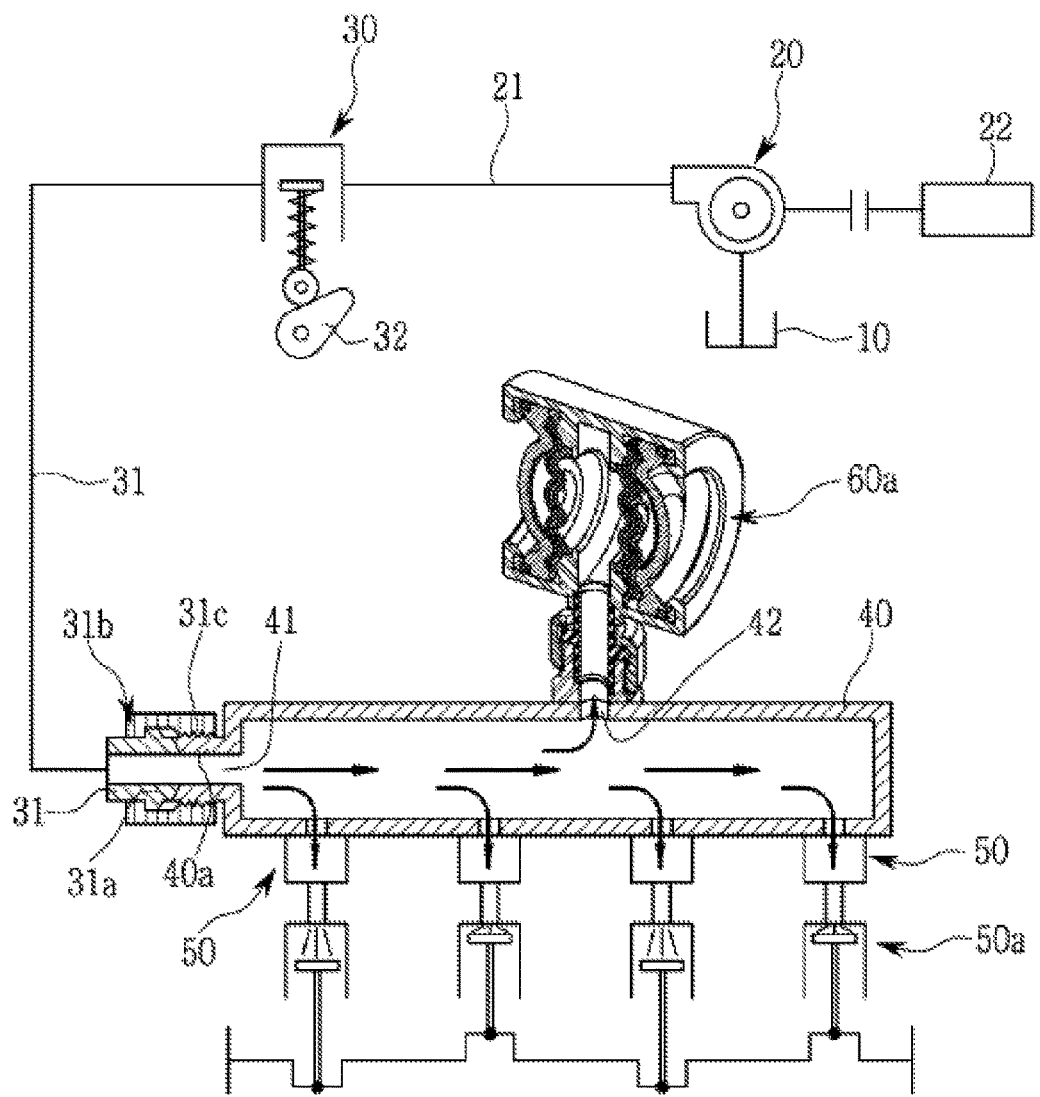
FIG. 1 is a diagram showing the installation state of a pulsation reducer according to an embodiment of the present invention.
Figure 2:
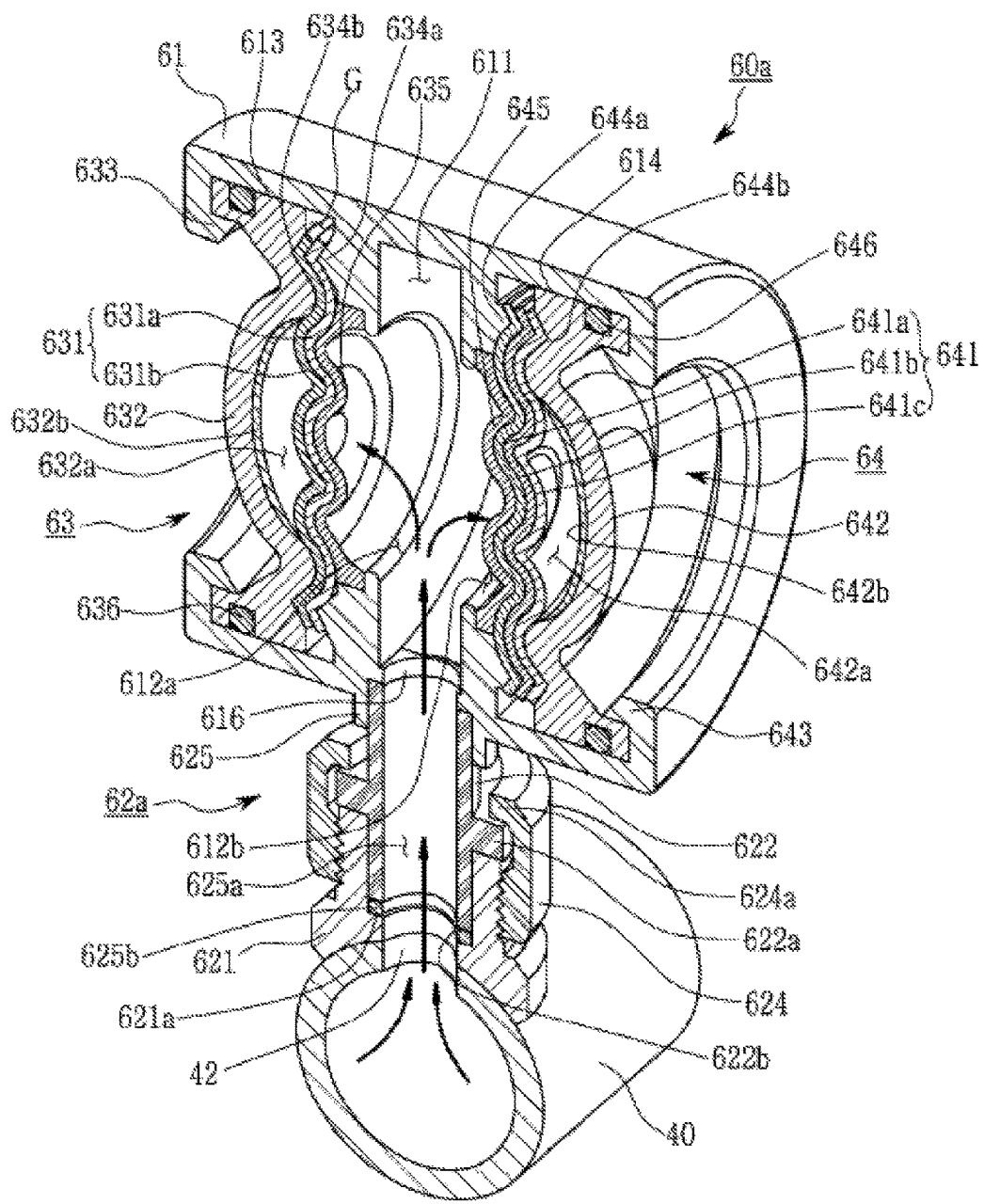
FIG. 2 is a perspective longitudinal section showing the pulsation reducer of FIG. 1.
Figure 3:
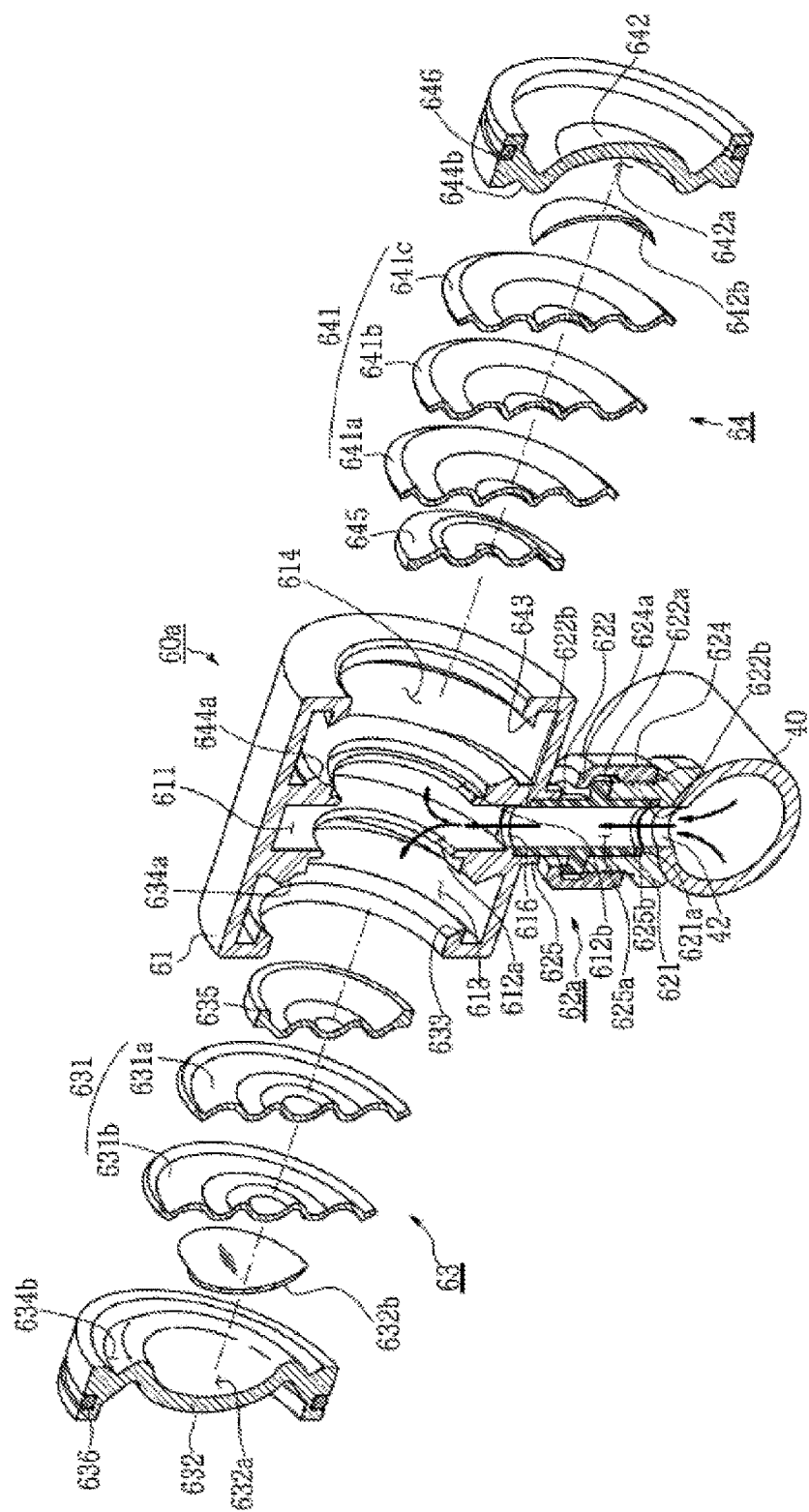
FIG. 3 is an exploded perspective view of the spring housing, low-pressure reduction part and high-pressure reduction part of FIG. 2.
Figure 4:
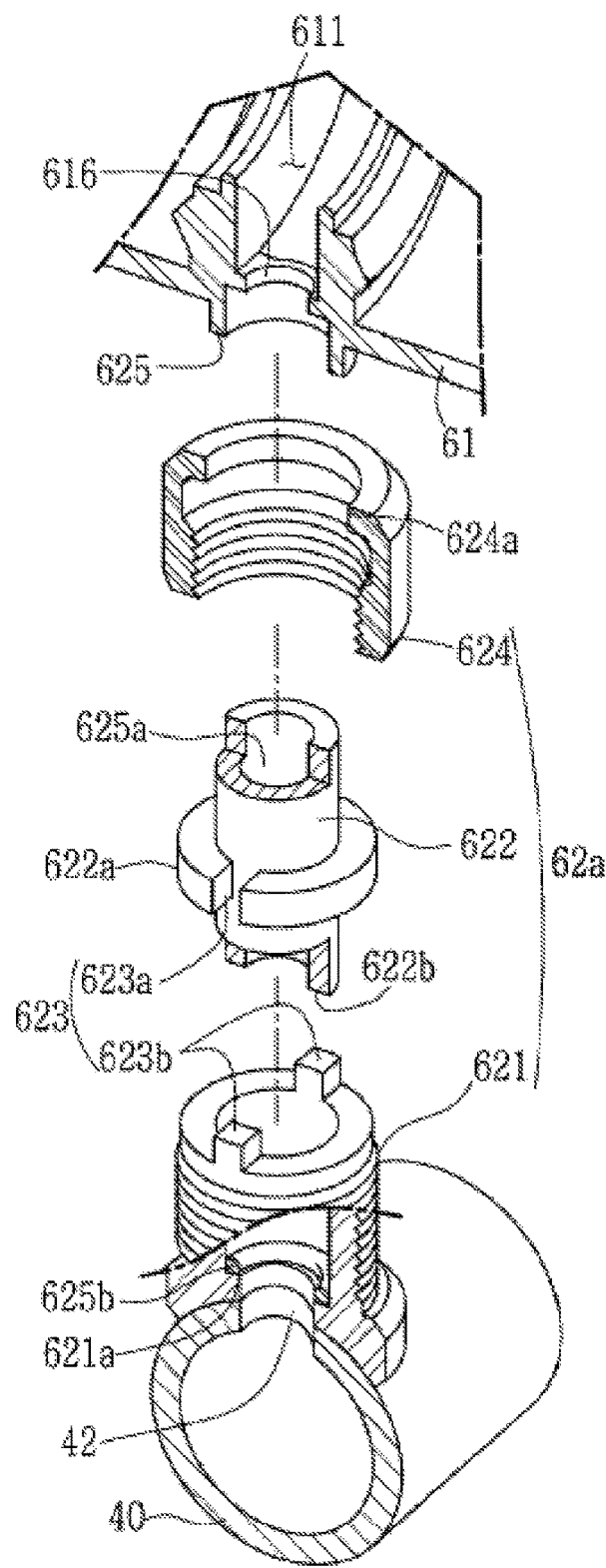
FIG. 4 is an exploded perspective view of the connection part of FIG. 2.
Figure 5:
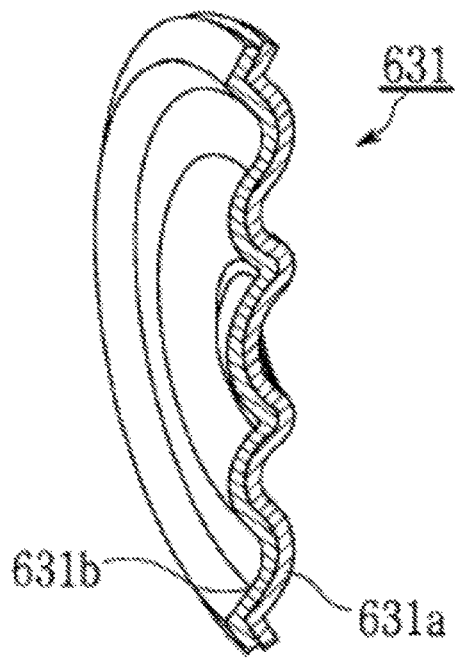
FIG. 5 is a longitudinal section perspective view showing the low-pressure multilayer waveform spring of FIG. 2.
Figure 6:
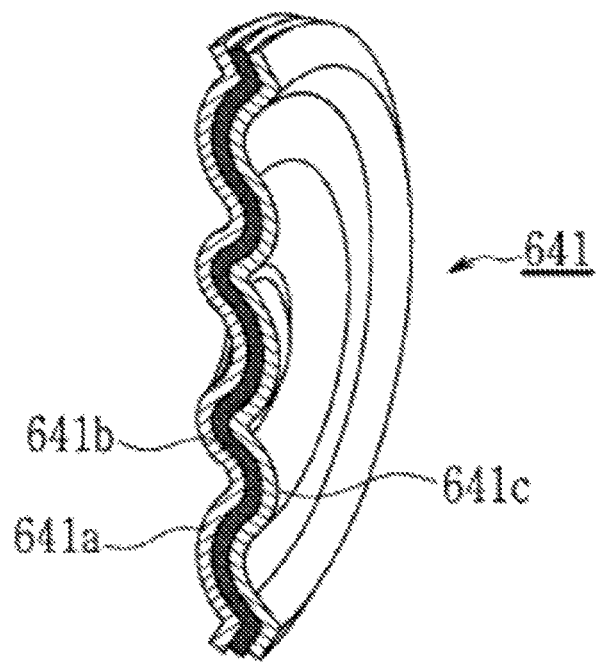
FIG. 6 is a perspective longitudinal section showing the high-pressure multilayer waveform spring of FIG. 2.

FIG. 1 is a diagram showing the installation state of a pulsation reducer according to an embodiment of the present invention, FIG. 2 is a perspective longitudinal section showing the pulsation reducer of FIG. 1, FIG. 3 is an exploded perspective view of the spring housing, low-pressure reduction part and high-pressure reduction part of FIG. 2, FIG. 4 is an exploded perspective view of the connection part of FIG. 2, FIG. 5 is a longitudinal section perspective view showing the low-pressure multilayer waveform spring of FIG. 2, and FIG. 6 is a perspective longitudinal section showing the high-pressure multilayer waveform spring of FIG. 2.

First, referring to FIG. 1, gasoline fuel stored in a fuel tank 10 is primarily transferred to a high-pressure piston fuel pump 30, i.e., a fuel high-pressure generator, through a low-pressure fuel line 21 by the operation of a low-pressure fuel pump 20. The low-pressure fuel pump 20 is driven by a low-pressure fuel pump motor 22. A vane pump is used as a low-pressure fuel pump 20, and thus the low-pressure fuel which is transferred from the low-pressure fuel pump 20 to the high-pressure piston fuel pump 30 has a low pressure equal to or lower than about 4.5 bars.

The low-pressure fuel is secondarily compressed into high-pressure fuel by the operation of the high-pressure piston fuel pump 30, and is supplied into an entrance-expanded fuel rail 40 through a section-expanded fuel rail entrance 41 via a high-pressure fuel line 31. The entrance-expanded fuel rail 40 has a section-expanded fuel rail entrance 41 which has no orifice which is installed in a conventional fuel rail entrance, which is connected to the high-pressure fuel line 31, and which has a section expanded to the size of the section of the high-pressure fuel line 31.

The high-pressure fuel line 31 is connected using a high-pressure fuel line nut 31b inserted into a high-pressure fuel line end flange 31a, an entrance-expanded fuel rail nipple 40a attached to one end of the entrance-expanded fuel rail 40, and high-pressure fuel line connection screws 31c.

The high-pressure piston fuel pump 30 is driven by a high-pressure fuel pump cam 32 which is coupled to an engine cam shaft. A piston pump is used as the high-pressure piston pump 30 in order to generate high-pressure fuel having a pressure equal to or higher than 350 bars.

High-pressure fuel having reached the inside of the entrance-expanded fuel rail 40 is accompanied by a high-pressure pulse wave generated by the high-pressure piston fuel pump 30, and thus the high-pressure pulse wave enters into the entrance-expanded fuel rail 40.

Mixed pulse waves in which a pump pulse wave generated by the high-pressure piston fuel pump 30 and a fuel injection pulse wave generated by a fuel injector 50 are mixed together are present inside the entrance-expanded fuel rail 40.

The mixed pulse waves may be amplified through a resonance phenomenon generated at a specific frequency, and may be cancelled out by a cancelation phenomenon generated at a specific frequency. When the amplification and cancellation phenomena of the mixed pulse waves are repeated, the fuel injection amount of the fuel injector 50 becomes irregular. The phenomenon in which the fuel injection amount becomes irregular causes an increase in the consumption of engine fuel.

In order to reduce mixed pulse waves, a pulsation reducer 60a according to the present embodiment is installed on the entrance-expanded fuel rail 40.

Referring to FIGS. 2 to 6, the pulsation reducer 60a according to the present embodiment includes a spring housing 61, a connection part 62a, a low-pressure reduction part 63, and a high-pressure reduction part 64.

The spring housing 61 is connected to the entrance-expanded fuel rail 40 via the connection part 62a. A fuel storage space 611 connected into the entrance-expanded fuel rail 40 via the connection part 62a is formed in the center of the inside of the spring housing 61.

A low-pressure movement space 613 connected to the fuel storage space 611 via a connection pipe path 625a is formed in the left side of the inside of the spring housing 61.

A high-pressure movement space 614 connected to the fuel storage space 611 via the connection pipe path 625a is formed in the right side of the inside of the spring housing 61.

The connection part 62a includes a connection nipple 621, a connection pipe 622, a location setting part 623, a connection nut 624, and a nipple O-ring 625b.

The connection nipple 621 has a preset length, and the inside of the connection nipple 621 is vertically penetrated. The bottom surface of the connection nipple 621 comes into contact with and is fastened to the outer surface of the entrance-expanded fuel rail 40. The inside of the connection nipple 621 is connected to the inside of the entrance-expanded fuel rail 40. An O-ring support projection 621a is formed on the lower side of the inside of the connection nipple 621. Screws are formed on the outer circumferential surface of the connection nipple 621.

The connection pipe 622 has a preset length. The top surface of the connection pipe 622 is coupled to the housing sleeve 625 of the spring housing 61, and the bottom surface of the connection pipe flange 622a comes into contact with the top surface of the connection nipple 621. A housing sleeve 625 protrudes from the inner circumferential surface of the spring housing 61 in the direction of the connection pipe 622.

A connection pipe flange 622a is formed at the center of the outer circumferential surface of the connection pipe 622.

The inside of the connection pipe 622 is vertically penetrated, and is connected to the fuel storage space 611. The bottom surface of the connection pipe 622 is formed as an O-ring sealing surface 622b which comes into contact with the nipple O-ring 625b.

The location setting part 623 includes a pair of location setting depressions 623a and a pair of location setting protrusions 623b.

The location setting depressions 623a are formed upward in the front and back portions of the connection pipe flange 622a.

The location setting protrusions 623b protrude upward from the front and back portions of the top surface connection nipple 621, and are inserted into the location setting depressions 623a. The spring housing 61 can be always coupled at the same location in the same direction through the engagement between the location setting protrusions 623b and the location setting depressions 623a.

The inside of the connection nut 624 is vertically penetrated. Screws which are engaged with the screws of the connection nipple 621 are formed on the lower circumferential surface of the inside of the connection nut 624. A connection nut projection 624a which comes into tight contact with the connection pipe flange 622a is formed on the upper circumferential surface of the inside of the connection nut 624. When the connection nut 624 and the connection nipple 621 are fastened together by the screws, the connection nut projection 624a presses the connection pipe flange 622a in the direction of the connection nipple 621. The top surface of the connection nipple 621 and the bottom surface of the connection pipe flange 622a come into tight contact with each other by the pressed connection pipe flange 622a.

The low-pressure reduction part 63 includes a low-pressure multilayer waveform spring 631, a low-pressure spring cover 632, a low-pressure spring airtight waveform membrane 635, and a low-pressure spring cover O-ring 636, and reduces mixed pulse waves in a low-pressure region.

The low-pressure multilayer waveform spring 631 includes a first low-pressure waveform spring 631a and a second low-pressure waveform spring 631b, and is disposed on the left side of the low-pressure movement space 613.

The first low-pressure waveform spring 631a and the second low-pressure waveform spring 631b are formed in the same structures. The first low-pressure waveform spring 631a and the second low-pressure waveform spring 631b are superimposed on each other.

The center portion of the first low-pressure waveform spring 631a is connected with the fuel storage space 611 through a chimney hole 612a. The edge of the first low-pressure waveform spring 631a comes into contact with the inner surface of the spring housing 61 which forms the low-pressure movement space 613.

The sections of the first low-pressure waveform spring 631a and the second low-pressure waveform spring 631b have waveform shapes.

The low-pressure spring cover 632 is disposed on the left side of the low-pressure movement space 613, and fastens the low-pressure multilayer waveform spring 631 within the low-pressure movement space 613.

The inner edge of the low-pressure spring cover 632 comes into contact with the outer edge of the second low-pressure waveform spring 631b. Accordingly, the edge of the low-pressure spring cover 632, the edge of the low-pressure multilayer waveform spring 631, and the inner surface of the spring housing 61 are superimposed on one another.

The pressing groove 634b configured such that the edge of the low-pressure multilayer waveform spring 631 is inserted thereinto is formed along the inner edge of the low-pressure spring cover 632 in a circumferential direction. A pressing protrusion 634a configured to press the low-pressure multilayer waveform spring 631 into the pressing groove 634b is formed on the inner surface of the spring housing 61.

The outer surface of the low-pressure spring cover 632 comes into contact with the inner surface of the spring housing 61. A low-pressure spring cover fastening plate 633 formed on the spring housing 61 is coupled to the outer surface of the low-pressure spring cover 632.

The low-pressure multilayer waveform spring 631 and the low-pressure spring cover 632 are fastened within the low-pressure movement space 613 by the low-pressure spring cover fastening plate 633 and the pressing protrusion 634a.

The outer circumferential surface of the low-pressure multilayer waveform spring 631 is spaced apart from the inner circumferential surface of the spring housing 61 by an interval G. When the outer circumferential surface of the low-pressure multilayer waveform spring 631 comes into contact with the inner circumferential surface of the spring housing 61, resistance may be generated when the low-pressure multilayer waveform spring 631 is coupled between the pressing protrusion 634a and the pressing groove 634b. However, when the outer circumferential surface of the low-pressure multilayer waveform spring 631 is spaced apart from the inner circumferential surface of the spring housing 61, the low-pressure multilayer waveform spring 631 may be easily coupled between the pressing protrusion 634a and the pressing groove 634b without the generation of resistance.

The center portion of the low-pressure spring cover 632 forms a curved surface-shaped space from the outer surface of the second low-pressure waveform spring 631b. Accordingly, a low-pressure spring movement space 632a is formed between the low-pressure spring cover 632 and the center portion of the second low-pressure waveform spring 631b.

A curved surface-shaped low-pressure spring cushion pad 632b is installed on the inner curved surface of the low-pressure spring cover 632 such that the low-pressure spring cushion pad 632b buffers and absorbs impact when the low-pressure multilayer waveform spring 631 comes into contact with the low-pressure spring cover 632 due to vibration and expansion.

The edge of the low-pressure multilayer waveform spring 631 is fastened, and the center portion of the low-pressure multilayer waveform spring 631 is located within a space. Accordingly, mixed pulse waves in a low-pressure region are applied to the center portion of the low-pressure multilayer waveform spring 631 in the fuel storage space 611. As the center portion of the low-pressure multilayer waveform spring 631 is vibrated by the mixed pulse waves in the low-pressure region, the mixed pulse waves in the low-pressure region are reduced.

The low-pressure spring airtight waveform membrane 635 is disposed between the low-pressure multilayer waveform spring 631 and the spring housing 61 inner surface. The low-pressure spring airtight waveform membrane 635 functions to absorb low-pressure mixed pulse waves present within the entrance-extended rail 40 while maintaining primary water-tightness in order to prevent the fuel of the fuel storage space 611 from leaking between the low-pressure multilayer waveform spring 631 and the spring housing 61.

The low-pressure spring cover O-ring 636 is disposed between the outer circumferential surface of the low-pressure spring cover 632 and the inner circumferential surface of the spring housing 61, and maintains secondary water-tightness.

The high-pressure reduction part 64 includes a high-pressure multilayer waveform spring 641, a high-pressure spring cover 642, a high-pressure spring airtight waveform membrane 645, and a high-pressure spring cover O-ring 646, and reduces mixed pulse waves in a high-pressure region.

Since the high-pressure spring cover 642, the high-pressure spring airtight waveform membrane 645, and the high-pressure spring cover O-ring 646 are the same as the above-described embodiments of the low-pressure spring cover 632, the low-pressure spring airtight waveform membrane 635, and the low-pressure spring cover O-ring 636, redundant descriptions are omitted.

However, there is a difference between the high-pressure multilayer waveform spring 641 and the low-pressure multilayer waveform spring 631. The low-pressure multilayer waveform spring 631 includes first and second low-pressure waveform springs 631a and 631b, whereas the high-pressure multilayer waveform spring 641 includes first, second, and third high-pressure waveform springs 641a, 641b and 641c. In other words, the high-pressure multilayer waveform spring 641 further includes the third high-pressure waveform spring 641c.

The third high-pressure waveform spring 641c is formed in the same structure as the first and second high-pressure waveform springs 641a and 641b. The third high-pressure waveform spring 641c is disposed inside the high-pressure spring cover 642. A high-pressure spring movement space 642a is formed between the third high-pressure waveform spring 641c and the high-pressure spring cover 642.

Accordingly, the edge of the high-pressure multilayer waveform spring 641 is fastened between the pressing protrusion 644a and the pressing groove 644b, and the center portion of the high-pressure multilayer waveform spring 641 is located within a space. Mixed pulse waves in the high-pressure region are applied to the center portion of the high-pressure multilayer waveform spring 641 within the fuel storage space 611. As the center portion of the high-pressure multilayer waveform spring 641 is vibrated by the mixed pulse waves in the high-pressure region, the mixed pulse waves in the high-pressure region are reduced.

Next, referring back to FIGS. 1 to 6, the operation of the above-described pulsation reducer 60*a* is described.

The mixed pulse waves present within the entrance-expanded fuel rail 40 reach the fuel storage space 611 through the fuel rail hole 42, the connection pipe path 625*a*, and the housing connection path 616.

The mixed pulse waves having reached the fuel storage space 611 vibrate the low-pressure multilayer waveform spring 631 and the high-pressure multilayer waveform spring 641. In other words, the low-pressure multilayer waveform spring 631 performs vibration plate movement within the low-pressure spring movement space 632*a* due to the low-pressure region (ranging from 35 to 100 bars) pulse waves of the mixed pulse waves having reached the fuel storage space 611. The mixed pulse waves in the low-pressure region (ranging from 35 to 100 bars) within the fuel are reduced by the vibration plate movement of the low-pressure multilayer waveform spring 631.

Furthermore, in the same manner, the high-pressure multilayer waveform spring 641 performs vibration plate movement within the high-pressure spring movement space 642*a* due to the high-pressure region (ranging from 100 to 350 bars) pulse waves of the mixed pulse waves having reached the fuel storage space 611. The mixed pulse waves in the high-pressure region (ranging from 100 to 350 bars) are reduced by the vibration plate movement of the high-pressure multilayer waveform spring 641.

As described above, the mixed pulse waves present within the entrance-expanded fuel rail 40 are reduced and then eliminated by the low-pressure multilayer waveform spring 631 and the high-pressure multilayer waveform spring 641 within the spring housing 61.

The high-pressure fuel from which the mixed pulse waves have been eliminated by the pulsation reducer 60*a* according to the present embodiment is injected into the engine cylinder 50*a* in the form of fine particles at a predetermined pressure by the fuel injector 50. Accordingly, engine combustion efficiency is increased, and thus vehicle fuel efficiency is improved.

Furthermore, mixed pulse waves within fuel are more effectively eliminated in the state in which an orifice, i.e., a conventional pulsation reducer, has been eliminated. Accordingly, engine efficiency is further improved by the pump loss of the high-pressure piston fuel pump 30.

Furthermore, mixed pulse waves within fuel are eliminated due to the pulsation reducer 60*a* according to the present embodiment, and thus engine vibration and noise reduction effects occur.

Furthermore, high-pressure fuel in which pulsation has been eliminated by the pulsation reducer 60*a* according to the present embodiment is converted into fine particles at a predetermined pressure and directly injected into the engine cylinder 50*a* by the fuel injector 50. Accordingly, fuel may be injected two or five times in a single stroke during fuel multi-port injection, i.e., during the injection of an engine. The fuel is completely combusted by fuel multi-port injection, and thus engine combustion efficiency can be further improved.

The fuel in which pulsation has been reduced is completely combusted, as described above, and thus a harmful materials attributable to the incomplete combustion of fuel is not generated, thereby considerably reducing atmospheric and environmental pollution.

Figure 7:
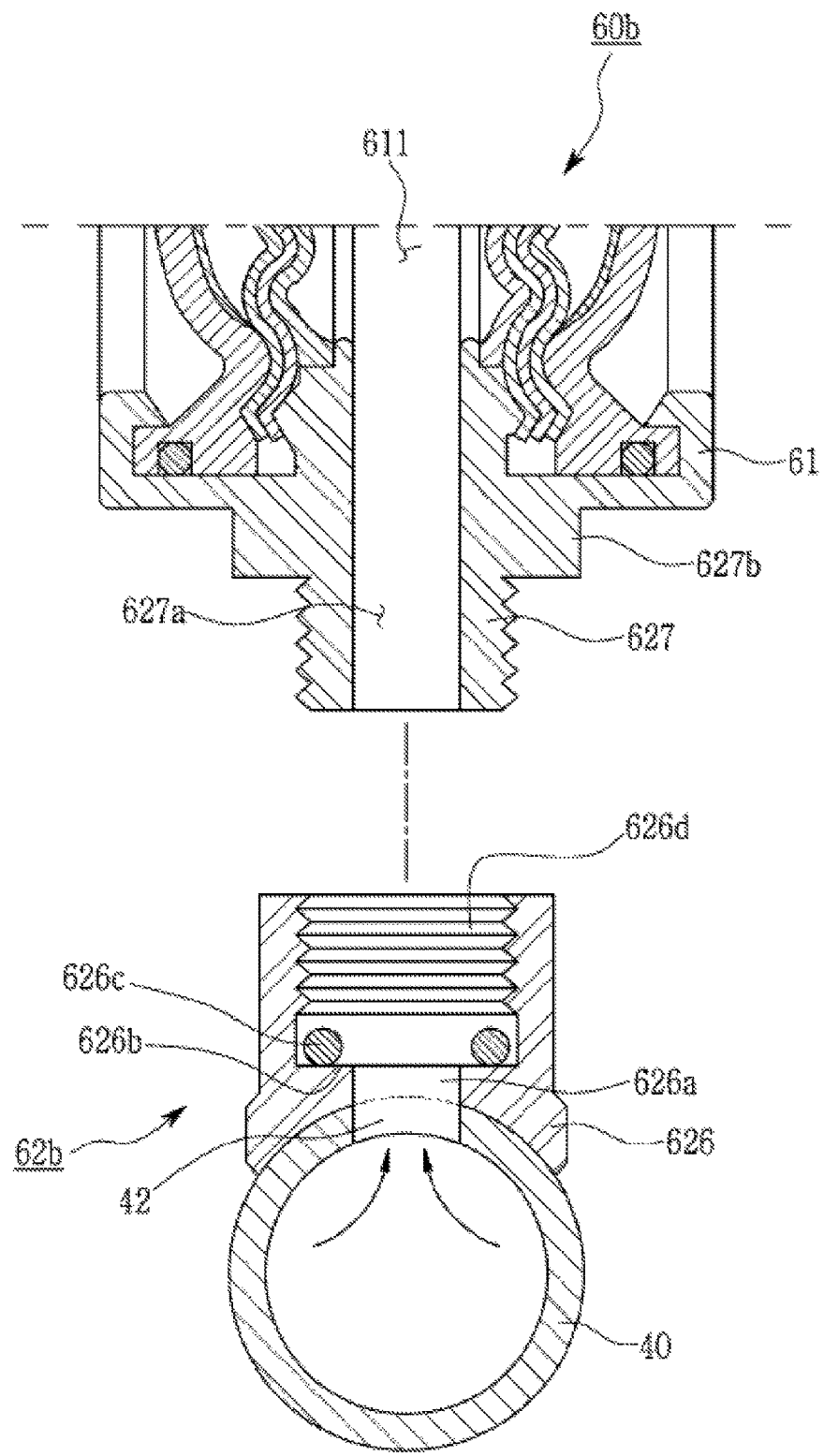
FIG. 7 is an exploded sectional view of a pulsation reducer according to another embodiment of the present invention.
Figure 8:
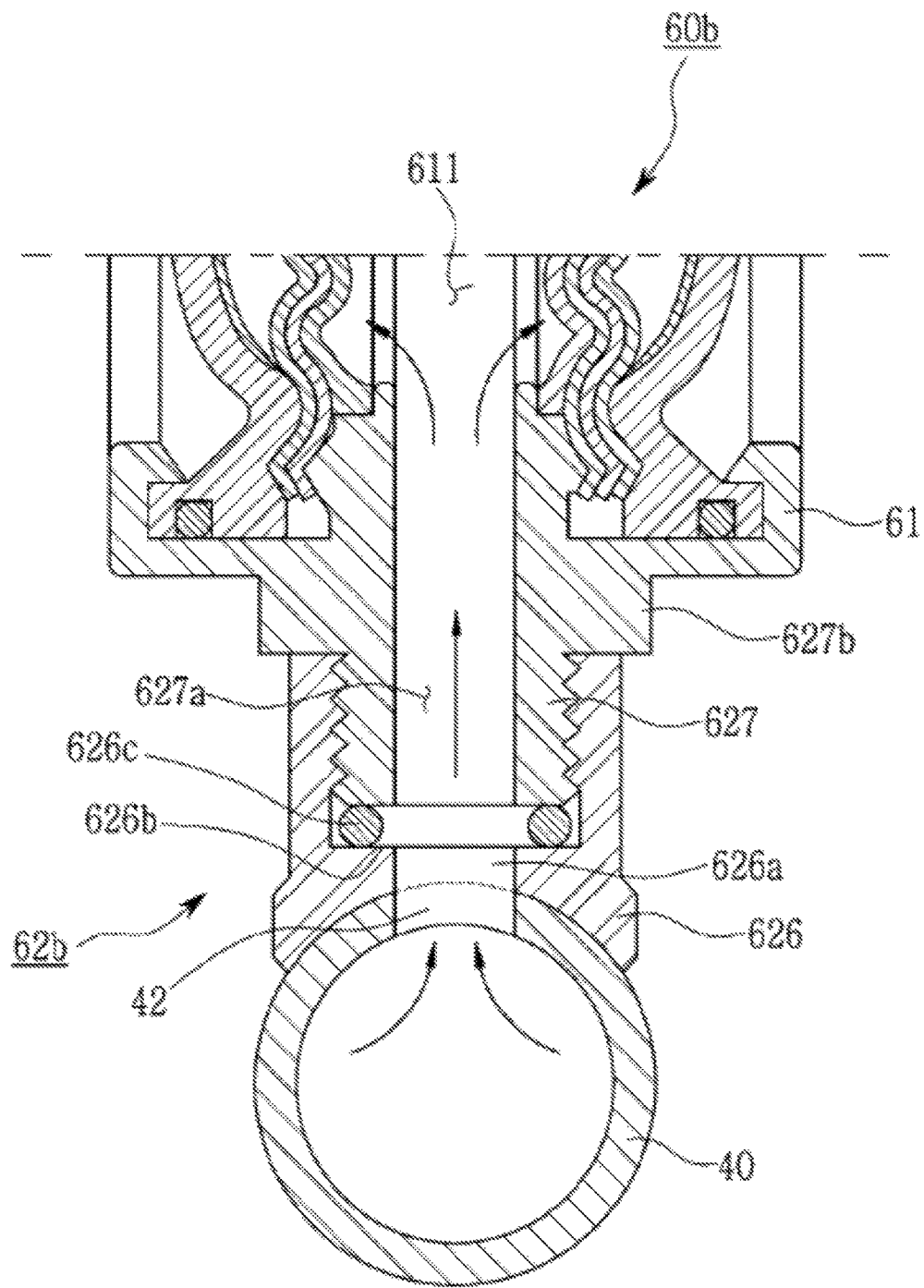
FIG. 8 is a sectional view showing the assembly state of the pulsation reducer of FIG. 7.

Next, referring to FIGS. 7 and 8, another embodiment of the present invention is described.

FIG. 7 is an exploded sectional view showing a pulsation reducer according to another embodiment of the present invention, and FIG. 8 is a sectional view showing the assembly state of the pulsation reducer of FIG. 7.

Referring to FIGS. 7 and 8, in the pulsation reducer 60*b* according to the present embodiment, all components except for the connection part 62*b* are the same as the corresponding components of the pulsation reducer according to the embodiments of FIGS. 1 to 6, and thus redundant descriptions are omitted.

The connection part 62*b* according to the present embodiment includes a connection socket 626, a flange bolt 627, and a socket O-ring 626*c*. A socket path 626*a* and flange connection path 627*a* configured to connect the inside of the entrance-expanded fuel rail 40 with the fuel storage space 611 are formed inside the connection socket 626 and the flange bolt 627.

The connection socket 626 may be coupled at a preset location of the outer circumferential surface of the entrance-expanded fuel rail 40. The inside of the connection socket 626 is penetrated, and is connected with the inside of the entrance-expanded fuel rail 40. An O-ring support projection 626*b* configured to support the socket O-ring 626*c* is formed on the lower side of the inside of the connection socket 626. Screws are formed on the inner circumferential surface of the connection socket 626.

The flange bolt 627 protrudes vertically from the housing flange 627*b* formed on the outer circumferential surface of the spring housing 61. The insides of the flange bolt 627 and the housing flange 627*b* are vertically penetrated, and are connected with the fuel storage space 611.

The lower side of the flange bolt 627 is inserted into the connection socket 626. Screws configured to be engaged with the screws of the connection socket 626 are formed on the outer circumferential surface of the flange bolt 627.

When the flange bolt 627 is coupled with the connection socket 626, the socket O-ring 626*c* is compressed between the flange bolt 627 and the O-ring support projection 626*b*, thereby maintaining water-tightness.

In other words, for the purpose of the screw assembly of the pulsation reducer 60*b* according to the present embodiment, a housing flange 627*b* and a flange bolt 627 connected to the spring housing 61 are installed. The flange bolt 627 and the connection socket 626 form a pair of corresponding components, and are engaged with each other, thereby enabling screw assembly.

In order to transfer mixed pulse waves from the inside of the entrance-expanded fuel rail 40 to the fuel storage space 611 of the spring housing 61, the flange connection path 627*a* is formed inside the flange bolt 627. The mixed pulse waves present within the entrance-expanded fuel rail 40 are transferred into the fuel storage space 611 through the fuel rail hole 42, the socket path 626*a*, and the flange connection path 627*a*, along with fuel.

Furthermore, water-tightness between the entrance-expanded fuel rail 40 and the spring housing 61 can be maintained in such a manner that the O-ring 626*c* is mounted between the O-ring support projection 626*b* of the connection socket 626 and the lower end of the flange bolt 627 and is fastened and fitted by the socket flange bolt 627.

The corresponding components of the embodiment of FIGS. 1 to 6 may be applied as the other components without change.

Figure 9:
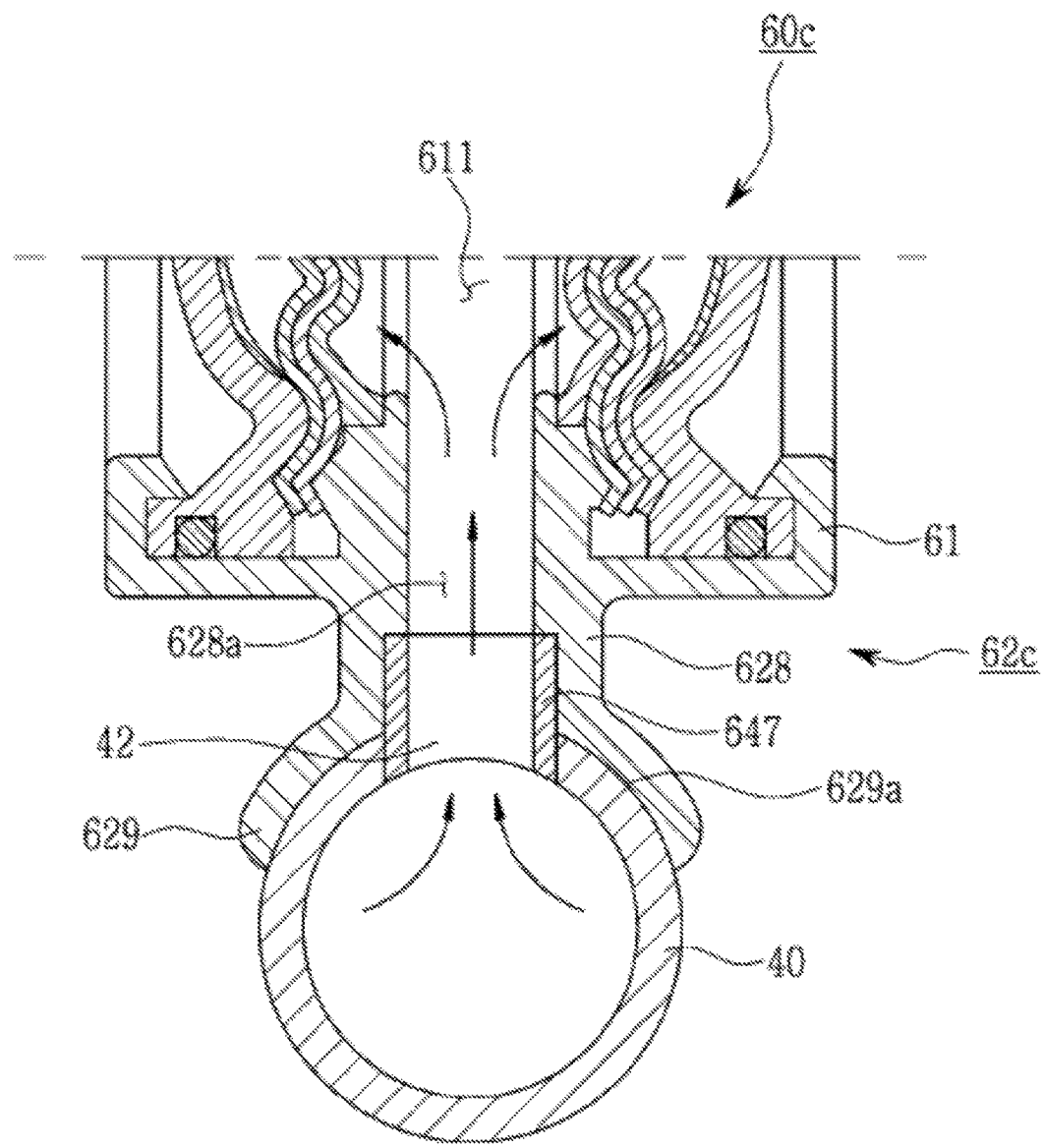
FIG. 9 is a sectional view showing a pulsation reducer according to another embodiment of the present invention.

Next, referring to FIG. 9, another embodiment of the present invention is described.

FIG. 9 is a sectional view showing a pulsation reducer according to the other embodiment of the present invention.

Referring to FIG. 9, in the pulsation reducer 60c according to the present embodiment, all components except for a connection part 62c are the same as the corresponding components of the pulsation reducer according to the embodiment of FIGS. 1 to 6, and thus redundant descriptions are omitted.

The connection part 62c according to the present embodiment includes a housing connection pipe 628 and a connection pipe flange 629, and a housing connection pipe path 628a configured to connect the fuel storage space 611 with the inside of the entrance-expanded fuel rail 40 is formed inside the housing connection pipe 628.

The housing connection pipe 628 has a preset length, and protrudes vertically from the outer circumferential surface of the spring housing 61. The housing connection pipe path 628a connected with the fuel storage space 611 is configured to vertically penetrate the inside of the housing connection pipe 628. An end of the housing connection pipe 628 is bonded to the outer circumferential surface of the entrance-expanded fuel rail 40.

The connection pipe flange 629 expands an area where the housing connection pipe 628 and the entrance-expanded fuel rail 40 come into contact with each other. The connection pipe flange 629 is bonded to the entrance-expanded fuel rail 40 by means of a brazing method.

In other words, in order to integrate the pulsation reducer 60c according to the present embodiment with the entrance-expanded fuel rail 40, the spring housing 61 is integrated with the housing connection pipe 628 and the connection pipe flange 629.

In order to transfer mixed pulse waves to the fuel storage space 611 of the spring housing 61 inside the entrance-expanded fuel rail 40, a housing connection pipe path 628a is formed inside the housing connection pipe 628.

Mixed pulse waves present within the entrance-expanded fuel rail 40 are transferred to the fuel storage space 611 through the fuel rail hole 42 and the housing connection pipe path 628a.

Furthermore, for the purpose of fuel-tightness between the entrance-expanded fuel rail 40 and the spring housing 61, a brazing surface 629a is formed between the connection pipe flange 629 and the outer circumferential surface of the entrance-expanded fuel rail 40. The entrance-expanded fuel rail 40 and the connection pipe flange 629 are bonded to each other by the brazing surface 629a in an integrated manner, and thus water-tightness is maintained between the entrance-expanded fuel rail 40 and the spring housing 61.

Furthermore, the brazing surface 629a is expanded by inserting the insertion tube 647 between the housing connection pipe path 628a of the connection pipe flange 629 and the fuel rail hole 42, and thus the bonding strength between the connection pipe flange 629 and the entrance-expanded fuel rail 40 is improved.

The corresponding components of the embodiment of FIGS. 1 to 6 may be applied as the other components without change.

Although the preferred embodiments of the present invention have been described in detail below, the range of the rights of the present invention is not limited thereto. However, various alterations and modifications of a person skilled in the art using the fundamental concept of the present invention defined in the attached claims pertain to the range of the rights of the present invention.

The invention claimed is:

1. A pulsation reducer, comprising:
   an entrance-expanded fuel rail (40) configured such that a section-expanded fuel rail entrance (41) expanded to a size of a section of a high-pressure fuel line (31) is formed thereon;
   a spring housing (61) configured such that a fuel storage space (611) and a low-pressure movement space (613) and high-pressure movement space (614) connected to the fuel storage space (611) via chimney holes (612a and 612b) are formed therein;
   connection parts (62a, 62b and 62c) configured to connect the spring housing (61) with the entrance-expanded fuel rail (40);
   a low-pressure reduction part (631) disposed in the low-pressure movement space (613), and configured to absorb mixed pulse waves in a low-pressure region; and
   a high-pressure reduction part (64) disposed in the high-pressure movement space (614), and configured to absorb mixed pulse waves in a high-pressure region;
   wherein the fuel storage space (611) is connected with an inside of the entrance-expanded fuel rail (40), and the mixed pulse waves reach the low-pressure reduction part (63) and the high-pressure reduction part (64) through the fuel storage space (611) inside the entrance-expanded fuel rail (40), along with fuel, and are reduced.

2. The pulsation reducer of claim 1, wherein:
   the low-pressure reduction part (63) comprises:
   a low-pressure multilayer waveform spring (631) configured to attenuate the mixed pulse waves in the low-pressure region, and a low-pressure spring cover (632) configured to fasten the low-pressure multilayer waveform spring (631) within the low-pressure movement space (613); and
   a center portion of an inside of the low-pressure multilayer waveform spring (631) is connected with the fuel storage space (611) through a chimney hole (612a), an outer surface of the low-pressure multilayer waveform spring (631) and a center portion of an inside of the low-pressure spring cover (632) form a curved surface-shaped space, and a low-pressure spring movement space (632a) configured such that the low-pressure multilayer waveform spring (631) vibrates therein is formed between the outer surface of the low-pressure multilayer waveform spring (631) and the center portion of the inside of the low-pressure spring cover (632).

3. The pulsation reducer of claim 2, wherein the low-pressure multilayer waveform spring (631) comprises a first low-pressure waveform spring (631a) and a second low-pressure waveform spring (631b), and the first low-pressure waveform spring (631a) and the second low-pressure waveform spring (631b) are made of different materials and formed to have different thicknesses.

4. The pulsation reducer of claim 2, wherein an edge of the low-pressure spring cover (632), an edge of the low-pressure multilayer waveform spring (631), and an inner surface of the spring housing (61) forming the low-pressure movement space (613) are superimposed on one another, a pressing groove (634b) configured such that an edge of the low-pressure multilayer waveform spring (631) is inserted thereinto is formed along an inner edge of the low-pressure spring cover (632) in a circumferential direction, a pressing protrusion (634a) configured to press the low-pressure multilayer waveform spring (631) into the pressing groove (634b) is formed on the inner surface of the spring housing (61), and an outer surface of the low-pressure spring cover (632) comes into contact with the inner surface of the spring housing (61).

5. The pulsation reducer of claim 2, wherein the low-pressure reduction part (63) further comprises:
a low-pressure spring airtight waveform membrane (635) disposed between an inner surface of the spring housing (61) and the low-pressure multilayer waveform spring (631) forming the low-pressure movement space (613), and configured to absorb low-pressure mixed pulse waves within the entrance-extended rail (40) while maintaining primary water-tightness; and a low-pressure spring cover O-ring (636) disposed between the inner surface of the spring housing (61) and an outer surface of the low-pressure spring cover (632).

6. The pulsation reducer of claim 2, wherein a curved surface-shaped low-pressure spring cushion pad (632b) is installed on an inner curved surface of the low-pressure spring cover (632) such that the low-pressure spring cushion pad (632b) buffers and absorbs impact when the low-pressure multilayer waveform spring (631) comes into contact with the low-pressure spring cover (632) due to vibration and expansion.

7. The pulsation reducer of claim 1, wherein:
the high-pressure reduction part (64) comprises a high-pressure spring cover (642) configured to fasten the high-pressure multilayer waveform spring (641) and the high-pressure multilayer waveform spring (641), which attenuate the mixed pulse waves in the high-pressure region, within the high-pressure movement space (614); and
a center portion of an inside of the high-pressure multilayer waveform spring (641) is connected to the fuel storage space (611) through a chimney hole (612b), an outer surface of the high-pressure multilayer waveform spring (641) and a center portion of an inside of the high-pressure spring cover (642), which are opposite to each other, form a curved surface-shaped space, and a high-pressure spring movement space (642a) configured such that the high-pressure multilayer waveform spring (641) vibrates therein is formed between the outer surface of the high-pressure multilayer waveform spring (641) and the center portion of the inside of the high-pressure spring cover (642).

8. The pulsation reducer of claim 7, wherein the high-pressure multilayer waveform spring (641) comprises a first high-pressure waveform spring (641a), a second high-pressure waveform spring (641b), and a third high-pressure waveform spring (641c), and the first high-pressure waveform spring (641a), the second high-pressure waveform spring (641b), and the third high-pressure waveform spring (641c) are made of different materials and formed to have different thicknesses.

9. The pulsation reducer of claim 7, wherein an edge of the high-pressure spring cover (642), an edge of the high-pressure multilayer waveform spring (641), and an inner surface of the spring housing (61) forming the high-pressure movement space (614) are superimposed on one another, a pressing groove (644b) configured such that an edge of the high-pressure multilayer waveform spring (641) is inserted thereinto is formed along an inner edge of the high-pressure spring cover (642) in a circumferential direction, a pressing protrusion (644a) configured to press the high-pressure multilayer waveform spring (641) into the pressing groove (644b) is formed on the inner surface of the spring housing (61), and an outer surface of the high-pressure spring cover (642) comes into contact with the inner surface of the spring housing (61).

10. The pulsation reducer of claim 7, wherein the high-pressure reduction part (64) further comprises: a high-pressure spring airtight waveform membrane (645) disposed between the inner surface of the spring housing (61) and the high-pressure multilayer waveform spring (641) forming the high-pressure movement space 614, and configured to absorb high-pressure mixed pulse waves within the entrance-extended rail (40) while maintaining primary water-tightness; and a high-pressure spring cover O-ring (646) disposed between the inner surface of the spring housing (61) and the outer surface of the high-pressure spring cover (642).

11. The pulsation reducer of claim 7, wherein a curved surface-shaped high-pressure spring cushion pad (642b) is installed on an inner curved surface of the high-pressure spring cover (642) such that the curved surface-shaped high-pressure spring cushion pad (642b) buffers and absorbs impact when the high-pressure multilayer waveform spring (641) comes into contact with the high-pressure spring cover (642) due to vibration and expansion.

12. The pulsation reducer of claim 1, wherein the connection part (62a) comprises:
a connection nipple (621) configured to be coupled with the entrance-expanded fuel rail (40);
a connection pipe (622) connected to the spring housing (61) and detachably coupled to the connection nipple (621);
a connection nut (624) configured to connect the connection pipe (622) with the connection nipple (621); and
a nipple O-ring (625b) disposed in an inner surface of the connection nipple (621) which is opposite to a bottom surface of the connection pipe (622).

13. The pulsation reducer of claim 12, wherein:
the connection part (62a) further comprises a location setting depression (623a) and a location setting protrusion (623b) formed in a portion where the connection nipple (621) and the connection pipe (622) come into contact with each other; and
when the location setting protrusion (623b) is inserted into the location setting depression (623a), a direction of the spring housing (61) is set.

14. The pulsation reducer of claim 1, wherein:
the connection part (62b) comprises:
a connection socket (626) configured to have a fastening hole (626d) and to be coupled to the entrance-expanded fuel rail (40);
a flange bolt (627) formed in the spring housing 61 and tightened into the fastening hole (626d); and
a socket O-ring (626c) disposed between the flange bolt (627) and the connection socket (626); and
a socket path (626a) and a flange connection path (627a) configured to connect an inside of the entrance-expanded fuel rail (40) with the fuel storage space (611) are formed inside the connection socket (626) and the flange bolt (627).

15. The pulsation reducer of claim 1, wherein:
the connection part (62c) comprises:
a housing connection pipe (628) configured to protrude from the spring housing (61); and a connection pipe flange (629) connected to the housing connection pipe (628), and configured to come into contact with an outer surface of the entrance-expanded fuel rail (40);

a housing connection pipe path (628*a*) configured to connect the fuel storage space (611) with the entrance-expanded fuel rail (40) is formed inside the housing connection pipe (628), and the entrance-expanded fuel rail (40) and the spring housing (61) are bonded to each other on the brazing surface 629*a* in an integrated manner while maintaining water-tightness therebetween.

16. The pulsation reducer of claim 15, wherein the brazing surface (629*a*) is expanded by inserting an insertion tube (647) between the housing connection pipe path (628*a*) of the connection pipe flange (629) and the fuel rail hole (42), thereby improving bonding strength between the connection pipe flange (629) and the entrance-expanded fuel rail (40).

* * * * *